(12) United States Patent
Opolka

(10) Patent No.: US 7,059,740 B2
(45) Date of Patent: Jun. 13, 2006

(54) BAR-SHAPED LAMP

(75) Inventor: Rainer Opolka, Solingen (DE)

(73) Assignee: Zweibruder Optoelectronics GmbH, Solingen (DE)

( * ) Notice: Subject to any disclaimer, the term of this patent is extended or adjusted under 35 U.S.C. 154(b) by 167 days.

(21) Appl. No.: 10/625,963

(22) Filed: Jul. 24, 2003

(65) Prior Publication Data

US 2004/0156189 A1     Aug. 12, 2004

(30) Foreign Application Priority Data

Aug. 12, 2002  (DE) .......................... 202 12 529 U

(51) Int. Cl.
*B25B 23/18*     (2006.01)
(52) U.S. Cl. ..................... 362/119; 362/102; 362/109; 362/153.1; 362/253
(58) Field of Classification Search ................ 362/119, 362/120, 102, 109, 153.1, 253
See application file for complete search history.

(56) References Cited

U.S. PATENT DOCUMENTS 4,658,534 A * 4/1987 McLean ..................... 43/21.2
6,162,002 A * 12/2000 Rohrmoser et al. ......... 411/441
6,511,203 B1 * 1/2003 Winther ..................... 362/202

* cited by examiner

*Primary Examiner*—Stephen Husar
*Assistant Examiner*—Mark Tsidulko
(74) *Attorney, Agent, or Firm*—Andrew Wilford

(57) ABSTRACT

A bar-shaped lamp having a battery housing in the form of a shaft with a lamp head removably attached at one end and provided with one or more light-emitting diodes. At the other end a reversible foot member can be inserted into the shaft and has a ground spike and an impact tool for breaking automobile glass on opposite sides. When the short tool projects from the shaft, it can be covered by a cap.

9 Claims, 5 Drawing Sheets

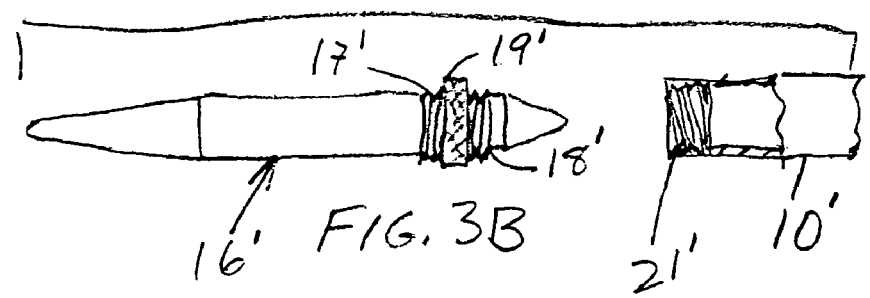
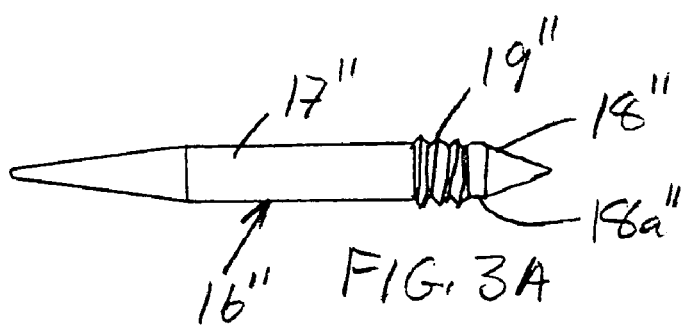
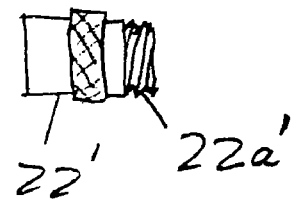

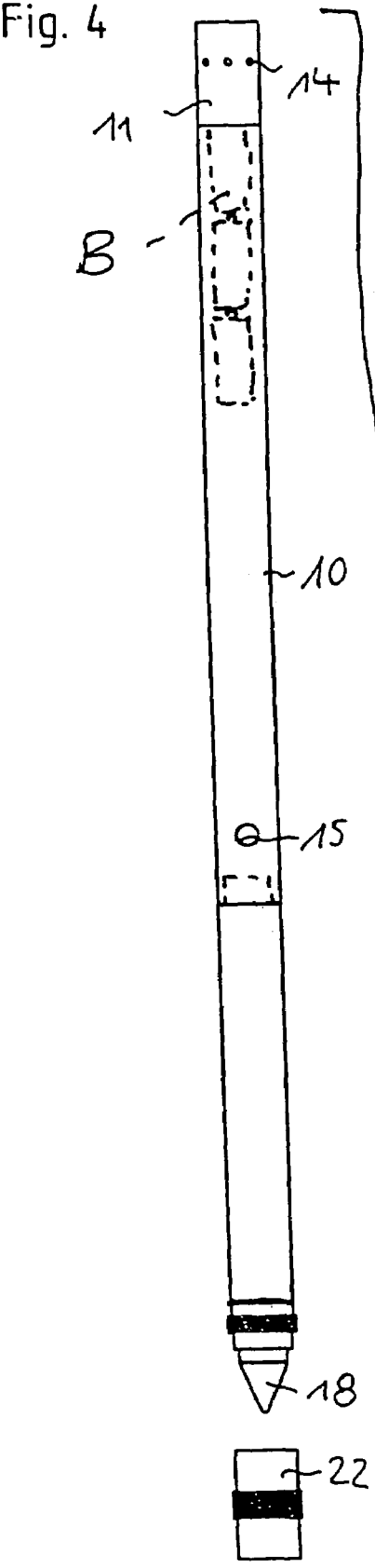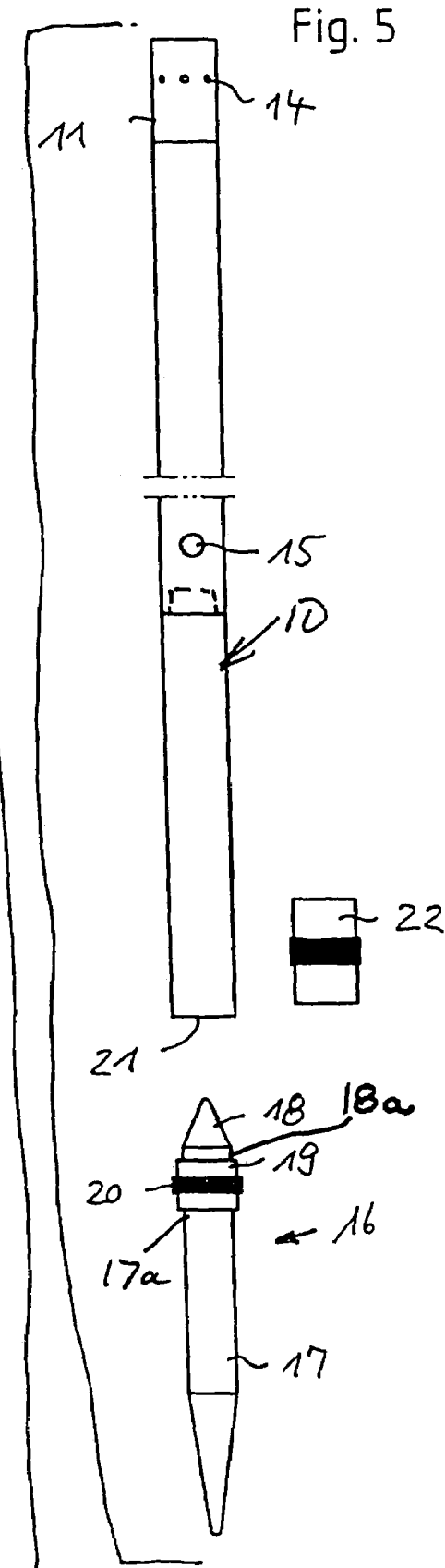

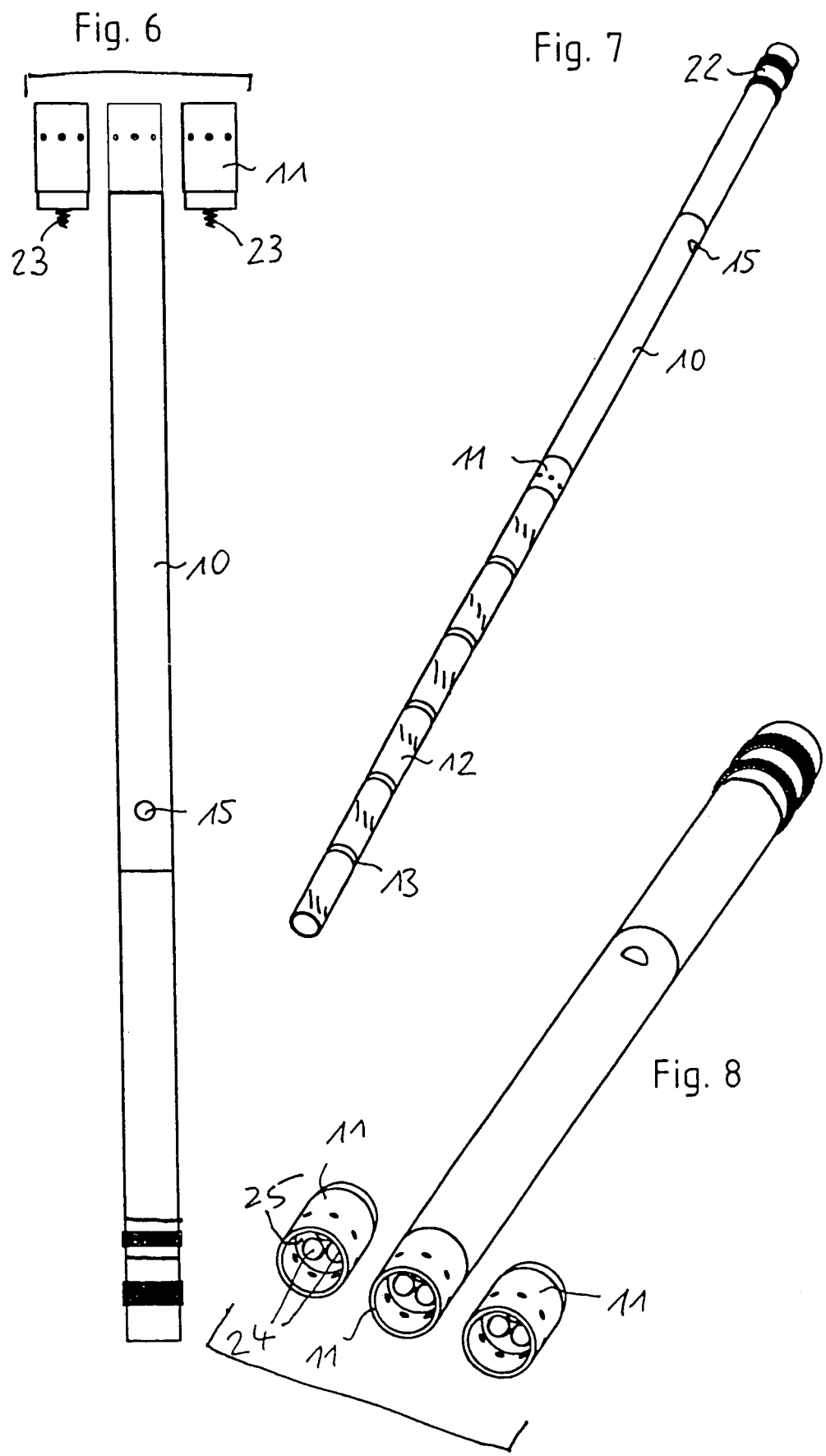

BAR-SHAPED LAMP

FIELD OF THE INVENTION

The present invention relates to a bar-shaped lamp and, more particularly, to a lamp having an elongated battery housing forming a shaft or as part of a shaft and a lamp head at one end of this shaft having at least one light source which preferably can be one or more light-emitting diodes.

BACKGROUND OF THE INVENTION

In WO 02/057684, corresponding to U.S. patent application Ser. No. 10/332,401 filed 7 Jan. 2003, a lamp has been described for use in the home which has a lamp base, a lamp shaft and a light source and wherein the light source is replaceable in the lamp shaft. The lamp can be used as a pole lamp or table lamp and the light source can be one or more light-emitting diodes. On the shaft a replaceable lighting body can be mounted which can be contiguous with the shaft and can extend in line therewith and which is composed of a light conducting and preferably transport material, for example a plastic from which the light can emerge laterally.

In that system, the electrical supply may be provided through the shaft to the light-emitting diodes.

In another embodiment, the lamp can be a bar-shaped flashlight and the shaft can form a battery housing which can be closed by a battery housing cover at one end, i.e. the end from which the shaft has been unscrewed from a base. The lamp can be used with or without such light-conducting bodies.

The advantage to a portable lamp which operates with light-emitting diodes is that the light-emitting diodes have significantly less current requirements than incandescent and even fluorescent portable lamps so that at a given battery capacity, the useful life of the lamp is significantly greater. Light-emitting diodes are also less sensitive to impact than portable and pocket lamps provided with incandescent bulbs. Even independently of impacts and rough handling, flashlights with incandescent bulbs have a significantly shorter life span than a flashlight provided with a light-emitting diode.

OBJECTS OF THE INVENTION

It is the principal object of the present invention to extend the principles set out in the aforementioned application and, in particular, to provide an improved bar-shaped lamp with increased versatility.

Another object of this invention is to provide a bar-shaped lamp which is capable of more widespread use than previous lamps of this type and is nevertheless easy to handle.

Still another object of the invention is to provide an improved flashlight and especially one for emergency applications, which has significant advantages over earlier flashlights designed for emergency applications.

SUMMARY OF THE INVENTION

These objects and others which will become apparent hereinafter are attained, in accordance with the present invention, in a bar-shaped flashlight which has at a shaft end opposite its lamp head a foot member which is reversible and removable from the respective shaft end and which has an elongated spike which can be inserted into ground at one end and that foot member and at a second end thereof an impact tool. Either of these ends can be received in the shaft while the other end projects from the extremity of the shaft in which that foot member is mounted.

More particularly, the bar-shaped lamp of this invention can comprise:

an elongated shaft;

a lamp head affixed to one end of the shaft and provided with a light source; and a reversible elongated foot member receivable in the shaft at an opposite end of the shaft and having at a first end of the foot member an elongated spike adapted to be inserted into the ground and at a second end of the foot member an impact tool capable of rupturing a vehicle window.

The bar-shaped lamp of the invention, apart from its primary function as a portable lamp, i.e. a flashlight, can, when the spike projects from the end of the shaft, also be used by inserting the lamp in the ground so that it can serve as garden or landscape illumination, as illumination for pathways or roadways, or even as decorative lighting.

However, with the foot member reversed in the end of the lamp, thereby exposing the impact tool, the lamp can be used in an emergency to break an automobile windshield or door or rear window pane to assist a trapped individual. Frequently in an emergency, a vehicle door cannot be opened and thus access to the driver or trapped passengers cannot be accomplished by the opening of one or more of the doors or the lowering of a door window. The individual within the vehicle can thus assist himself or herself by utilizing the impact tool of the present invention to assist in escape or to permit assistance by persons outside the vehicle.

The same holds true in the case of a fire in a residence or other structure in which the breaking of a window will enable assistance to trapped individuals or some other form of assistance. In some cases, as well, emergency situations may involve the development or accumulation of gases, like carbon monoxide, and the breakage of a window utilizing the tool may facilitate ventilation of the space or removal of an ignition or explosion danger.

In all of these cases and indeed wherever an emergency situation which could be benefited by the use of the flashlight as an impact tool, the convertible foot member of the invention can be effective.

In most instances in the past, a flashlight or the like has been incapable of use as an impact tool and thus a separate tool was required to assist in escape from a vehicle or the like. In that case, the assisting person had to search for a hammer or other implement to assist the trapped individual.

With the flashlight of the invention, this problem is eliminated entirely since the foot member can readily be switched between its spike or impact tool, the spike itself may be used as such a tool where necessary and, where a cover or cap is provided, simple removal of the cap may expose the pointed impact tool.

Furthermore, because the versatility of the lamp is increased by the spike which allows it to be used in a garden or pathway illumination setting, the lamp is more accessible to individuals who wish to assist a trapped person than an ordinary flashlight might be.

According to the invention, moreover, an acrylic rod may be removably affixed to the lamp head to distribute the illumination from the light-emitting diodes and enable the lamp to be used in a garden or decorative setting to further increase its utility.

The ends of the foot member may both be pointed and of a conical configuration, in which case the apex angle of the impact tool is preferably greater than the apex angle of the spike or, conversely, the apex angle of the spike can be smaller than the apex angle of the impact tool. This thus facilitates insertion of the spike into the ground but ensures that the impact tool will be able to withstand the impact with a windshield or the like without bending.

The impact tool can thus be more stubby and less pointed than the spike. The stubby configuration of the tool avoids a piercing of the windshield and increases the chances of a more general rupture upon impact.

For convenience in handling, the foot member has a cylindrical intermediate piece whose outer diameter is substantially equal to the inner diameter of the end of the shaft opposite that which is provided with the lamp head, so that this intermediate piece can be either friction fitted into the shaft or connected thereto by a threaded or screw connection. The latter is preferred since it is substantially more stable than a friction fit.

According to a further feature of the invention, the lamp head is also replaceable on the lamp shaft, preferably via a screw or threaded connection.

In this manner, the complete lamp head with one or more light-emitting diodes can be replaced, when, for example, a lamp head emitting light to a different color is desirable. The lamp heads can also have one, two or three light-emitting diodes in a set and the set may include light-emitting diodes with blue, green, red or white light. Light-emitting diodes, depending upon type, have different emission spectra, so selection of diodes which emit white, blue, orange, yellow and red light is relatively simple.

The user of the lamps of the invention in, for example, a garden party, can use lamps of different light emission colors to various effects. For example, pathways can be illuminated by lamps stuck into the ground alongside these pathways and emitting white light and various locations or paths may be lit with red, blue or yellow light by simply replacing their lamp heads to show paths to different locations or simply for color effects which are thus obtained. At the location of the party, of course, acrylic rods can be screwed onto the lamp heads for their contribution to the lighting effects.

As noted, each lamp head can have one or more light-emitting diodes, a plate or printed circuit board on which the diode or diodes are mounted and a spiral contact spring which can project into the lamp shaft, for example, to spring load the batteries therein and to make contact with the uppermost battery or a single battery if only one is provided.

A flashlight in accordance with the invention should have at the battery housing end a cap which can be screwed onto the shaft or removed therefrom, which can be equipped with a contact spring for the other end of the battery set and which can apply a spring pressure to the batteries. The cap can enclose, for example, the impact tool of the foot member, in which case removal of the cap prepares the foot member for use as a glass-breaking tool.

When the lamp head is removed, access to the batteries can be provided for battery removal and insertion.

The foot member can have a central part between the spike and the impact tool which can have an external thread onto which the internal thread of the cap may be engaged, and which, in addition, may be used to hold the foot member in the shaft. The cap can also be threaded directly into the shaft and the shaft may, if desired, have a compartment below the battery compartment for receiving the spike of the foot member.

As has already been indicated, a rod-shaped light-transmitting member can be releasably attached to the lamp head and may have an outer diameter which is the same as the outer diameter of the shaft. This light-transmitting body is preferably composed of a plastic, like, for example, a polyacrylate. A polymethylmethacrylate (PMMA) is preferred. Between the lamp head and the acrylic rod a screw connection is preferably provided. For this purpose, the lamp head may have at its open end an internal thread in which an external screw thread of the acrylic rod with identical thread pitch can be engaged. The acrylic rod serves as a passive illuminating element that is capable of emitting a diffuse light from diffusion surfaces of a matte finish. Special light effects can be obtained from grooves milled into the outer surface of the acrylic rod and whose shapes can be selected optionally. The grooves make the geometric contour of the rod clearly visible by enhanced reflection.

According to another feature of the invention each lamp head has preferably three light-emitting diodes with the same color or different color light characteristics. If all of the diodes with different color emissions are turned on simultaneously, color mixtures of the light are provided. Electronic on/off switching can be provided so that different color mixers are obtained periodically with different on and off times. The result, of course, is a variety of color effects. Simultaneously a flashing or on/off function can be provided. A single series switch can be used or use can be made of a corresponding number of switches which have the different functions.

BRIEF DESCRIPTION OF THE DRAWING

The above and other objects, features, and advantages will become more readily apparent from the following description, reference being made to the accompanying drawing in which:

FIG. 1A is a side view of a cap following its removal from the shaft;

FIG. 3A is a side view of a foot member showing the spike and the impact tool separated by a screw thread;

FIG. 3B is an exploded view of the spike and the end of the shaft remote from the lamp head showing a threaded connection between the two;

FIG. 4 is a view similar to FIGS. 1–3 of another lamp according to the invention and in which a friction fit is provided between the foot member and the cap;

FIG. 5 is a view similar to FIG. 4 of the same lamp showing the relationship of the foot member, the shaft and a cap which has been removed to allow the foot member to be reversed;

FIG. 6 is a side elevational view of a lamp according to the invention with two additional lamp heads which are interchangeable with the lamp head shown on the lamp;

FIG. 7 is a perspective view of a bar-shaped lamp having an acrylic rod with a multiplicity of grooves attached by a screw thread to the lamp head;

FIG. 8 is a perspective view of the lamp of FIG. 6 with the set of replaceable lamp heads.

SPECIFIC DESCRIPTION

Figure 1:
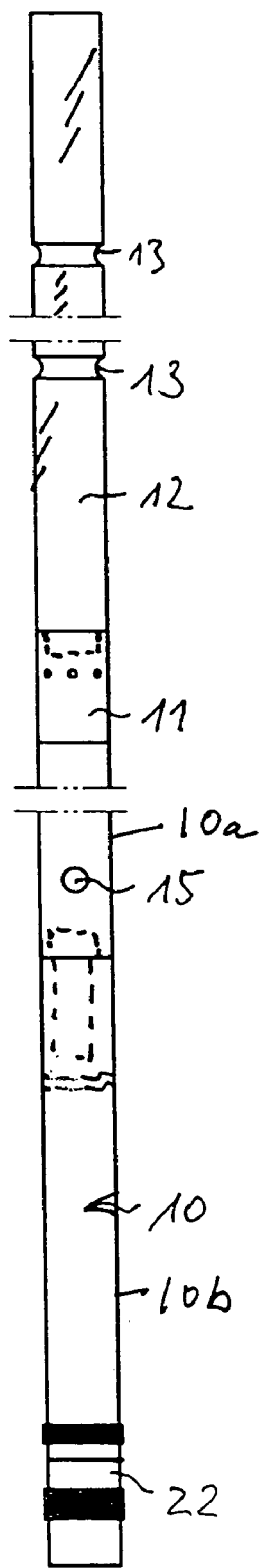
FIG. 1 is a side view of a bar-shaped lamp according to the invention with the foot member fully concealed by a cap and in which an acrylic rod is mounted on the lamp head.
Figure 2:
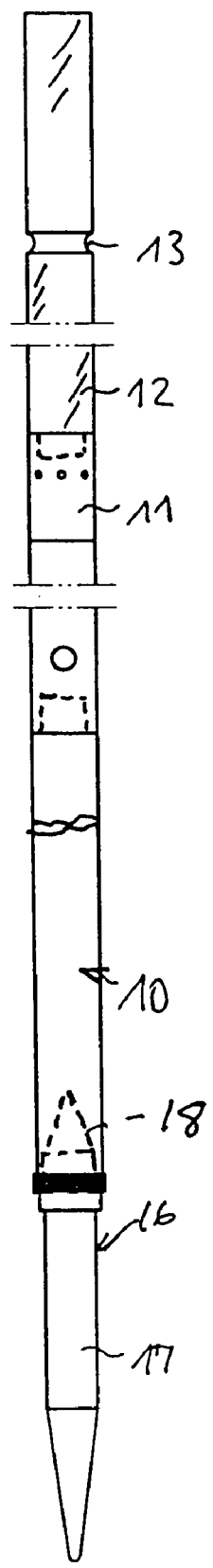
FIG. 2 is a view similar to FIG. 1 of the same lamp but wherein the cap has been removed and the spike protrudes from the end of the shaft opposite that at which the head is provided.
Figure 3:
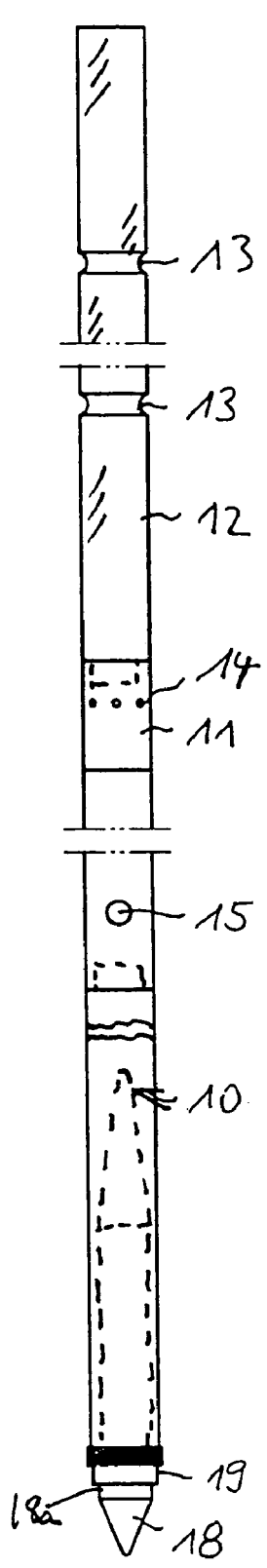
FIG. 3 is a view similar to FIG. 1 and FIG. 2 of the same lamp but wherein the impact tool is exposed at the lower end.

FIGS. 1–3 show a bar-shaped lamp with a cylindrical lamp shaft 10 which can have a battery housing 10a and a compartment 10b which is primarily designed to receive the spike of a foot member (see FIG. 3) and which can be attached to the battery housing 10a by a screw thread or friction fit and which, if desired, can include batteries as well. On the battery compartment switch 15 can be provided to turn on and off the lamp. The switch 15, which is shown as a press switch, may have a variety of positions to obtain different light emissions from the head as previously noted.

At the upper end of the shaft 10, a lamp head 11 is provided and, if desired, this lamp head can be removably threaded into the shaft or press-fitted with a friction fit therein and can have an internal screw thread to which, as shown at FIGS. 1–3, an acrylic rod 12 can be attached. The acrylic rod, which can have a cylindrical configuration, can be of the same diameter as the shaft and flush with the head 11 and the shaft 10 may have a matte surface capable of emitting light as delivered to the acrylic rod by the light-emitting diodes of the head 11.

The acrylic head 12 can have one or more annular grooves 13. The length of the lamp shaft 10 can be optional but is preferably between 30 and 50 cm and can be dimensioned to hold any desired number of batteries. The diameter of the lamp shaft is likewise optional, is equal to that of the lamp head 11 and is chosen to accommodate the kind of batteries which are preferred, e.g. between 2 and 3 cm.

The lamp head may have a multiplicity of bores 14 along a circumference through which light is emitted from the light-emitting diodes of the head as a trademark indicating the source of the lamp, namely, the assignee of the present application.

The position of the push button switch 15 on the lamp shaft 10 can be chosen at will. The length of the acrylic rod 12 can likewise be selected arbitrarily and for aesthetic reasons and handling purposes, the length of the acrylic rod may be approximately equal to the length of the lamp shaft and the lamp head together.

According to the invention, at the end of the shaft opposite the lamp head, a foot member 16 is releasably fastened. One end of this foot member 16 is formed as a spike 17 which can be forced into the ground. The second end 18 is formed as an impact tool.

As FIG. 5 shows, the foot member 16 can have a cylindrical central piece 19 with collar 20 which separates cylindrical segments 17a and 18a, each of which is of the same diameter as the internal bore of the end 21 of the shaft 10 so that a friction fit can be formed between the foot member 16 and the shaft 10 in each of the two positions shown in FIGS. 2 and 3, respectively.

A cap 22 may have an internal bore of the same diameter as the cylindrical part 18a so that it can be fitted over the tool 18 (FIG. 1) to conceal this tool (compare FIGS. 1 and 4) when the latter need not be used.

Moreover, the foot member 16' may have a knurled or milled ring 19' separating screw threads 17' and 18' which can be threaded into a female thread 21' on the end of a shaft 10' (see FIG. 3B) when a screw thread connection is to be made between the foot member 16' and the shaft 10'.

Alternatively (see FIG. 3A), a region 19" between the glass-breaking tool 18" and the spike 17" of the foot member 16" may be provided as a screw thread which can be threaded into the shaft 10' so that either the spike or tool may project. In that case, the cap may be fitted over the smooth portions 18a" of the tool 18" (FIG. 3A). FIG. 1A shows a cap 22' which is provided with an external thread 22a' which can fit the thread 21' at the end of the shaft 10' (FIG. 3B). In the case of the arrangement shown in FIG. 3B, a cap with an internal thread can engage the screw thread between the impact tool and the knurled ring 19' if desired.

The cap 22, 22' etc. need only have a depth to accommodate the projecting length of the impact tool 18.

The spike 17 has an upper part which is cylindrical and a lower part which tapers downwardly to enable the spike to be easily thrust into the soil. The impact tool 18 is substantially shorter, conical and with a rounded point and with a significantly larger apex angle than the spike.

The lamp can be provided with or without the cap 22 and with or without the acrylic rod 12. Should it be inserted in the ground as a stationary lamp, of course, the cap 22 must be removed, the foot member 16 unscrewed (from the position shown in FIGS. 3 and 4), the foot member reversed and the spike 17 (FIG. 5) thrust into the ground.

Figure 9:
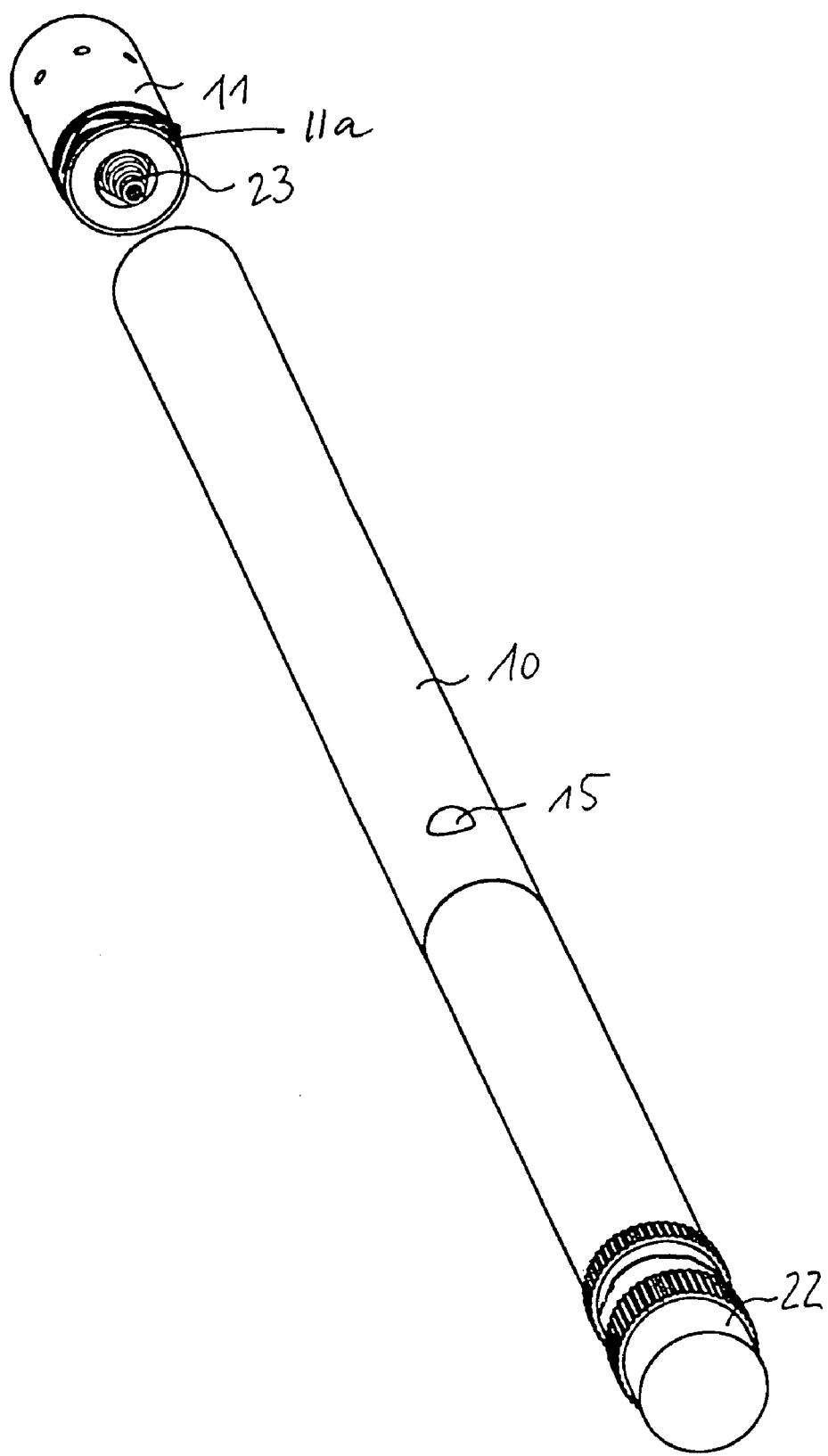
FIG. 9 is a perspective view of the lamp of the invention with the lamp head unscrewed.

As FIGS. 6 and 8 show, different lamp heads 11 can be mounted at the upper end of the shaft e.g. via the screw thread 11a (FIG. 9). At the rear end of the had a spiral string 23 is provided which can make contact with the uppermost battery V in the shaft 10. The lamp heads shown in FIG. 8 each have three light-emitting diodes 24 mounted upon a plate 25.

FIG. 7 shows an entire lamp according to the invention including its acrylic rod 12 with spaced-apart grooves 13 and indicates that the length of that rod 12 is approximately equal to that of the shaft 10. The grooves 13 may be milled into the acrylic resin of the otherwise solid rod. Such rods are desirable for space illumination, garden parties and the like.

The lamp has its spike 17 removed in FIG. 7 but its cap 22 in place. The lamp can be used as a long flashlight, without the acrylic rod 12 screwed into the lamp head 11, in an automotive vehicle for general use, although it is also an effective tool for fire fighters, police, EMT technicians and other personnel who can utilize the impact tool to free a trapped individual or the like.

The acrylic rod can be applied for illumination purposes during vacations or for temporary lighting in an area in which the flashlight is inserted in the ground. The lamp head can have the construction shown in the aforementioned copending application and can use a reflector for increased illumination efficiency.

It is claimed:

1. A bar-shaped lamp comprising:

an elongated shaft;

a lamp head affixed to one end of said shaft and comprising a plate, a plurality of light-emitting diodes mounted on said plate and a spiral contact spring resiliently engageable with a battery in said shaft;

a reversible elongated foot member receivable in said shaft at an opposite end of said shaft and having at a first end of said foot member an elongated conical spike adapted to be inserted into the ground and at a second end of said foot member a conical impact tool capable of rupturing a vehicle window, said spike and said tool having respective apex angles with the apex angle of said spike being less than the apex angle of said tool, said foot member having a portion between said spike and said tool which is flush with said shaft and adapted to be inserted into said shaft;

a threaded connection replaceably securing said lamp head on said shaft;

a plate, a plurality of light-emitting diodes mounted on said plate and a spiral contact spring resiliently engageable with a battery in said shaft; and a cap adapted to receive said tool and threaded onto said foot member.

2. The bar shaped lamp defined in claim 1, further comprising an elongated light-transmitting body affixed to said head and illuminatable thereby.

3. The bar-shaped lamp defined in claim 2 wherein said body is a rod of a light-conducting plastic.

4. The bar-shaped lamp defined in claim 3 wherein said rod is composed of polymethylmethacrylate and is threadedly connected to said shaft.

5. The bar-shaped lamp defined in claim 1 wherein said shaft comprises a battery holder and a compartment dimensioned to receive said spike.

6. A bar-shaped lamp comprising:

an elongated shaft;

a lamp head affixed to one end of said shaft and provided with a light source;

a reversible elongated foot member receivable in said shaft at an opposite end of said shaft and having at a first end of said foot member an elongated spike adapted to be inserted into the ground and at a second end of said foot member an impact tool capable of rupturing a vehicle window, said shaft comprising a battery holder and a compartment dimensioned to receive said spike; and a cap adapted to receive said tool and threaded onto said foot member.

7. The bar-shaped lamp defined in claim 6, further comprising an elongated light-transmitting of an acrylic resin body affixed to said head and illuminatable thereby.

8. The bar-shaped lamp defined in claim 7 wherein said lamp head comprises a plate, a plurality of light-emitting diodes mounted on said plate and a spiral contact spring resiliently engageable with a battery in said shaft.

9. The bar-shaped lamp defined in claim 8 wherein said foot member has a portion between said spike and said tool which is flush with said shaft and adapted to be inserted into said shaft.

* * * * *